United States Patent [19]

Sebel

[11] 3,755,044

[45] Aug. 28, 1973

[54] ADHESIVE COMPOSITIONS AND METHOD OF APPLICATION

[76] Inventor: Hans-Georg Sebel, Dusseldorf, Germany

[22] Filed: June 25, 1971

[21] Appl. No.: 156,954

[30] Foreign Application Priority Data
June 27, 1970 Germany.................. P 20 31 881.4

[52] U.S. Cl.................. 156/289, 156/306, 156/334, 161/164, 161/167, 161/250, 161/406
[51] Int. Cl............................................. B32b 31/00
[58] Field of Search.................. 156/334, 327, 276, 156/289, 306, 278; 260/29.6 X; 106/271, 272; 161/164, 167, 235, 250, 406

[56] References Cited
UNITED STATES PATENTS
3,598,677   8/1971   Bergmeister et al............ 156/334 X Primary Examiner—William J. Van Balen
Attorney—Hammond & Littell

[57] ABSTRACT

An aqueous dispersion adhesive composition for preventing sliding or riding up of stacked packaged articles having coverings of paper, cardboard or pasteboard comprising an aqueous dispersion containing from 3 percent to 60 percent by weight based on the total composition, of an adhesive dispersible in water with surface-active agents selected from the group consisting of paraffins having a melting point range between 40° C to 100° C, polyalkylenes having from two to eight carbon atoms in the alkylene and average molecular weights of between 2,000 and 25,000, and mixtures thereof, and the method of preventing sliding or riding up of packaged articles which comprises interspersing between said packaged articles, a layer of said aqueous dispersion adhesive composition.

7 Claims, No Drawings

ADHESIVE COMPOSITIONS AND METHOD OF APPLICATION

THE PRIOR ART

It is known to prevent the sliding of packing materials during transport on flat pallets or during storage by inserting adhesive between the surfaces of the packages which are in contact. Aqueous alkali metal silicate solutions, rubber or natural resin dispersions and plasticized polymerisate dispersions can be used as adhesives, which have a film formation temperature of not more than 10° C. These adhesives are generally provided with relatively large amounts of fillers.

All these products, however, show disadvantages in use. In particular, the adhesive power of most of the products is too high, especially with respect to packages with a small surface strength, so that the packing tears and is damaged when taking down the pile. Moreover, in the case of packages filled with warm to hot material, the necessity to provide a good connection separable without damage to the surface is often not attained. This is especially true for polyvinyl acetate dispersions. Further, most substances containing fillers leave considerable residues on the surfaces of the packing material, so that the packages are unsightly and printed instructions thereon may become unreadable.

Furthermore, on emptying the packages, the contents thereof may consequently be contaminated by brittle, crumbling deposits. In regard to technical use, the previously known compositions also have the disadvantage that their consistency, their pot life and their setting speed are not capable of sufficient variation of adjustment.

OBJECTS OF THE INVENTION

An object of the invention is the obtention of an aqueous dispersion adhesive composition for preventing sliding or riding up of packaged articles having coverings of paper, cardboard or pasteboard; the properties of which may be varied within wide limits to give optimum properties with a great variety of different surfaces of packing materials.

Another object of the invention is the obtention of an aqueous dispersion adhesive composition for preventing sliding or riding up of stacked packaged articles having coverings of paper, cardboard or pasteboard comprising an aqueous dispersion containing from 3 percent to 60 percent by weight based on the total composition, of an adhesive dispersible in water with surface-active agents selected from the group consisting of paraffins having a melting point range between 40° C to 100° C, polyalkylenes having from two to eight carbon atoms in the alkylene and average molecular weights of between 2,000 and 25,000, and mixtures thereof.

A further object of the invention is the development of a method for preventing the sliding or riding up of packaged articles having coverings of paper, cardboard or pasteboard during transport and storage, which comprises interspersing between said packaged articles, a layer of from 25 gm/m² to 500 gm/m² of an aqueous dispersion adhesive composition containing from 3 percent to 60 percent by weight based on the total composition, of an adhesive dispersible in water with surface-active agents selected from the group consisting of paraffins having a melting point range between 40° C to 100° C, and polyalkylenes having from two to eight carbon atoms in the alkylene and average molecular weights of between 2,000 and 25,000 and mixtures thereof.

These and other objects of the inventionn will become more apparent as the description thereof proceeds.

DESCRIPTION OF THE INVENTION

According to the invention there is provided an aqueous colloidal adhesive composition for preventing sliding or riding up of packaged articles having coverings of paper, cardboard or pasteboard during transport or storage comprising an aqueous dispersion adhesive composition.

The adhesive according to the present invention comprise an aqueous dispersion of a paraffin and/or a polyalkylene in which the alkylene residue contain from two to eight carbon atoms. Polyethylene and polypropylene dispersions are specially suitable.

The paraffin and/or polyalkylene may also be replaced even up to a considerable extent by a wax.

The paraffins used are those with a melting point which falls within the range 40° C to over 100° C, preferably between 50° C and 85° C. The polyalkylenes, preferably polyethylene, used have average molecular weights of 2,000 to 25,000, preferably 15,000 to 20,000. The paraffins and/or polyalkylenes should be dispersible in water with surface-active agents employed in amounts sufficient to effect the dispersion. The usual non-ionic or anionic emulsifying agents serve for the preparation of the dispersions, such as for example, fatty alcohol polyethyleneglycol or polypropyleneglycol ethers or their sulfation products. The quantity of the dispersed paraffins and/or polyalkylenes in the adhesive amounts to 3 percent to 60 percent by weight, preferably 5 percent to 40 percent by weight, based on the total adhesive composition.

According to a preferred form of the invention, the adhesives may contain, in addition, aqueous dispersions of polymerizates and/or modified natural resins and/or natural or synthetic rubbers. The polymerizates used may be, for example, commercial dispersions of polyvinyl lower alkyl ethers, such as polyvinyl isobutyl ether; polyvinyl alkanoic acid esters such as polyvinyl acetate or polyacrylates; which if desired are also externally plasticized; or copolymerizates thereof. Suitable modified natural resins are, for example, hydrogenated colophony resin esters, for example of glycerine. The proportion of the dispersed polymerizates or resins in the adhesives may amount to 1 percent to 25 percent by weight, preferably 1 percent to 10 percent by weight, based on the total adhesive composition.

Further, it is specially advantageous to add water-soluble natural or synthetic macromolecular or colloidal substances to the adhesives according to the invention. For example, xanthan gum or a water-soluble cellulose ether, and also water-soluble salts of polyacrylic acid, polyvinylpyrrolidone or polyvinyl alcohol may be used. Xanthan gum is a polysaccharide which is built up essentially from glucose, mannose, the potassium salt of glucuronic acid and acetyl groups in the approximate molar proportion of 2 : 1 : 1 : 1, and also contains a subordinate amount of pyroracemic acid. The preparation of xanthan gum is known and is obtained by the action of the strain of bacterial *Xanthomas campestris* on aqueous solutions of glucose or starch [see Journal of Biochemical and Microbiological Technology and Engineering, Vol. III, No. 1 (1961), pp. 51-63]. Suitable water-soluble cellulose ethers are methylcellulose, hydroxypropylcellulose, hydroxyethylcellulose and hydroxypropylmethylcellulose. The proportion of organic colloids should be about 0.1 percent to 3.0 percent, preferably 0.5 to 2.0 percent by weight, based on the total adhesive composition. The said substances act as thickeners among other things.

Finally, the adhesives according to the invention advantageously contain in addition inorganic thickeners or fillers. For example, bentonite or very finely dispersed silicic acid may be used as inorganic thickeners. The quantities of inorganic thickeners used are from 0.1 to 20 percent by weight, preferably 1 to 10 percent by weight, based on the total adhesive composition.

In order to protect the adhesives against bacterial breakdown, known preservatives may be added to them. Those which are used here are principally those which are compatible with the adhesive components and the other additives. For example, formalin or formaldehyde, phenolic preservatives such as pentachlorophenolates, p-hydroxybenzoic acid esters, which are on the market under a variety of names, are suitable.

The preparation of the adhesives according to the invention is effected by stirring together the components until a homogenous emulsion is formed. In the case where water-soluble macromolecular substances or inorganic thickeners are co-employed, these are first dissolved or dispersed in a suitable quantity of water and then the further components are added.

The adhesives according to the invention may be used during the stacking of substances packed in paper or cardboard which during transport, loading or storage must not be allowed to ride up, slide off or shift with respect to one another. The adhesives according to the invention are used with particular advantage for safe stacking of shipping cartons of corrugated or straight cardboard, paper bags, and bundles wrapped with paper or cardboard covering and the like. They may also be used for packing substances with delicate or sensitive surfaces. They are used with special advantage in cases in which a rapid fixation of the packages is necessary.

The adhesives according to the invention may be applied by brushing or spreading on or by spraying, for example by means of pencils, brushes or rollers, covering the whole surface or only selected areas on the package surfaces which come in contact. It has been found especially suitable to apply them by means of jets in dots or strips on the surfaces to be treated by means of so-called continuous jet devices. Preferably, the adhesive compositions of the invention are applied in amounts of from 25 gm/m² to 500 gm/m².

The adhesives according to the invention are effective immediately after the packages are placed on the pile. After a very short time an initial adhesion able to withstand great stress is already attained. After drying the adhesive film and the surface of the packing material, the bond can be separated again when the pile is dismantled without the packing being thereby damaged.

The present invention will be further described with reference to the following specific examples which are not to be deemed limitative.

EXAMPLES

The examples are included in the following Table I. In the first column of the Table the number of the example is given. The next four columns describe the components of the adhesive. The mixtures were made up to 100 parts with water in each case.

The second column gives the parts by weight of the paraffin dispersion used as a 55 percent aqueous dispersion as well as the melting point in degrees Centigrade of the paraffin dispersed.

In the third column the parts by weight and the percentage solids content of the aqueous polyethylene dispersions are given, and also the average molecular weight of the dispersed polyethylene.

The fourth column gives the additions of further organic dispersions by parts by weight and the percent of solids content of these dispersions.

In the fifth column the content of organic macromolecular substances or inorganic thickeners is given. The viscosity of the organic colloids was measured according to Brookfield in a 2 percent aqueous solution at 20° C.

The preparation of the adhesives was carried out by first dissolving or satisfactorily dispersing the organic macromolecular substances and the inorganic thickeners by stirring into a sufficient quantity of water adapted to the formulation. The paraffin and/or polyethylene dispersion then, if desired the additions of further organic dispersions, as well as the residual amount of water, were homogenously incorporated, while stirring, in this batch. In each case 0.3 percent of formaldehyde (35 percent) was added as a preservative.

TABLE I

| Example number | Paraffin dispersion 55% | | Polyethylene dispersion | | | Further aqueous dispersions | | | Further additives | | |
|---|---|---|---|---|---|---|---|---|---|---|---|
| | Percent weight | Melting point, °C. | Percent weight | Percent solids content | Molecular weight | Percent weight | Substance | Percent solids content | Percent weight | Substance | cP |
| 1 | | | 70 | 56 | 16,000 | | | | | | |
| | | | 70 | 41 | 15,000 | | | | | | |
| 2 | 95 | 50/52 | | | | 5 | Polyvinyl isobutylether | 55 | | | |
| 3 | 80 | 57/60 | | | | 20 | Polyvinyl acetate | 53 | | | |
| 4 | 95 | 50/52 | | | | 5 | Glycerine ester of hydrogenated colophony. | 50 | | | |
| 5 | 15 | 50/52 | 35 | 56 | 16,000 | | | | | | |
| 6 | 95 | 57/60 | | | | 5 | Natural rubber | 70 | | | |
| 7 | | | 80 | 40 | 20,000 | 20 | Polyvinyl isobutylether | 55 | | | |
| 8 | 30 | 85 | | | | | | | 0.5 | Xanthan gum | 2,500 |
| 9 | 20 | 50/52 | | | | | | | 0.8 | Hydroxypropyl cellulose. | 2,000 |
| 10 | 10 | 50/52 | | | | | | | 0.9 | Hydroxypropyl cellulose. | 6,000 |
| 11 | | | 50 | 56 | 16,000 | | | | 1.1 | Ammonium polyacrylate. | |
| 12 | | | 30 | 40 | 18,000 | | | | 0.7 | Xanthan gum | 2,500 |
| 13 | 10 | 50/52 | 20 | 40 | 18,000 | | | | 0.6 | do | 2,500 |

TABLE I—Continued

| Example number | Paraffin dispersion 55% | | Polyethylene dispersion | | | Further aqueous dispersions | | | Further additives | | |
|---|---|---|---|---|---|---|---|---|---|---|---|
| | Percent weight | Melting point, °C | Percent weight | Percent solids content | Molecular weight | Percent weight | Substance | Percent solids content | Percent weight | Substance | MP |
| 14 | 20 | 50/52 | | | | 5 | Polyvinyl acetate | 50 | 1.5 | Hydroxypropyl cellulose. | 2,000 |
| 15 | 20 | 50/52 | | | | 2 | Polyvinyl isobutylether | 55 | 0.5 | Xanthan gum | 2,500 |
| 16 | 20 | 57/60 | | | | | | | 0.8 | Hydroxypropyl cellulose. | 2,500 |
| | | | | | | | | | 1.0 | Finely-dispersed silicic acid. | 200 |
| 17 | 30 | 57/60 | | | | | | | 5.0 | Bentonite | |

Packing materials of paper (bags,) cartons, which were partly printed and partly not printed, were coated in spots and strips with the adhesives. A good initial adhesion was observed. The packages were largely protected against riding up, but the piles could be dismantled again without damage to the surfaces.

For the Examples 1 to 17, the shearing strength (kp/cm$^2$), the peeling strength (gm/10 cm), and the coefficient of friction of the adhesive compositions as applied to paper were measured.

For the measurements, paper was used as conventionally applied for the manufacturing of paper bags. Two types of paper were employed, one was a soda draft paper of 70 gm/m$^2$; the other was a wet-strength kraft paper of 73 gm/m$^2$. The latter was slightly crimped. For the examination, each time so much of the adhesive agent was applied with a sizing comb so that an average coat of 100 gm/m$^2$ was attained. Subsequently, the papers were stacked above each other, namely, a treated one on an untreated one and loaded with a brick so that an average pressure of 15 gm/cm$^2$ was attained. After storing for 24 hours at a room temperature of about 23° to 25° C, the measurements were taken.

For the examination of the shearing strength the papers were pulled apart in a conventional tearing machine.

For the examination of the peeling strength, the papers were drawn apart also in a tearing machine whereby the peeling angle was almost 180°.

The coefficient of friction was measured in that the pulled-apart papers were stacked one above the other and the friction coefficient was determined with a load of 20 gm/cm$^2$ and a moving speed of 10 cm per minute. In the following Table II, the first column gives the consecutive number of the example; the second column gives the kind of paper (NK = soda kraft paper, LK = wet strong, slightly crimped kraft paper), and the following columns give the shearing strength in Kp per cm$^2$, the peeling strength in gm/10 cm and the coefficient of friction.

TABLE II

| Example No. | Paper Type | Shear strength kp/cm$^2$ | Peeling strength gm/10 cm | Coefficient of Friction (Peeled Sample) |
|---|---|---|---|---|
| 1 | NK | 1.7 | 180 | 0.5 |
| | LK | 2.0 | 160 | 0.55 |
| 2 | NK | 2.8 | 240 | 0.7 |
| | LK | 3.3 | 180 | 0.75 |
| 3 | NK | 2.9 | 220 | 0.4 |
| | LK | 4.0 | 160 | 0.45 |
| 4 | NK | 1.2 | 100 | 0.75 |
| | LK | 1.3 | 60 | 0.75 |
| 5 | NK | 2.3 | 100 | 0.45 |
| | LK | 2.9 | 80 | 0.5 |
| 6 | NK | 2.7 | 180 | 0.45 |
| | LK | 3.3 | 140 | 0.5 |
| 7 | NK | 1.8 | 360 | 0.5 |
| | LK | 3.3 | 300 | 0.55 |
| 8 | NK | 0.5 | 40 | 0.4 |
| | LK | 0.5 | 40 | 0.45 |
| 9 | NK | 1.7 | 340 | 0.4 |
| | LK | 2.5 | 280 | 0.5 |
| 10 | NK | 1.6 | 300 | 0.4 |
| | LK | 2.6 | 180 | 0.45 |
| 11 | NK | 1.5 | 380 | 0.5 |
| | LK | 1.9 | 280 | 0.55 |
| 12 | NK | 2.0 | 100 | 0.6 |
| | LK | 1.8 | 40 | 0.7 |
| 13 | NK | 2.4 | 140 | 0.45 |
| | LK | 1.2 | 100 | 0.5 |
| 14 | NK | 2.5 | 340 | 0.4 |
| | LK | 3.7 | 320 | 0.5 |
| 15 | NK | 2.6 | 320 | 0.7 |
| | LK | 3.1 | 280 | 0.75 |
| 16 | NK | 2.6 | 140 | 0.4 |
| | LK | 2.9 | 120 | 0.5 |
| 17 | NK | 1.9 | 120 | 0.5 |
| | LK | 2.2 | 100 | 0.6 |

EXAMPLE 18

Strips of the adhesive composition of Examples 1 to 17 of 15 cm width were applied lengthwise to the middle of one side of paper bags filled with powdered material, utilizing an adhesive applicator which applied strips of adhesive through a series of jet orifices at an application rate of 100 gm adhesive per 1 m$^2$ of the paper bag surface. The paper bags were stacked and palletized. After shipping, the paper bags were received in their original stack without any sliding between them. They were readily separated without tearing of the surfaces.

The preceding specific embodiments are illustrative of the practice of the invention. It is to be understood, however, that other expedients known to those skilled in the art may be employed without departing from the spirit of the invention or the scope of the appended claims.

I claim:

1. In a method for preventing the sliding or riding up of packages articles having coverings of paper, cardboard or pasteboard during transport and storage, which comprises applying a layer of adhesive material to the surfaces of packaged articles, drying the layer and placing the packaged articles in contact, the improvement which comprises utilizing as said adhesive material, a layer of from 25 gm/m$^2$ to 500 gm/m$^2$ of an aqueous dispersion adhesive composition containing from 3 to 60 percent by weight based on the total composition, of an adhesive dispersible in water with surface-active agents selected from the group consisting of paraffins having a melting point range between 40° to 100° C, polyalkylenes having from two to eight carbon atoms in the alkylene and average molecular weights of between 2,000 and 25,000 and mixtures thereof.

2. The method of claim 1, wherein the improvement further comprises separating the packaged articles without damaging the surfaces.

3. The method of claim 1 wherein said adhesive dispersible in water is polyethylene having an average molecular weight of from 15,000 to 20,000.

4. The method of claim 3 wherein said dispersion contains from 5 to 40 percent by weight of said polyethylene.

5. The method of claim 1 wherein said adhesive composition has a further content of from 1 to 25 percent by weight based on the total composition, of a modifier additive dispersible in water with surface-active agents selected from the group consisting of polymerizates, modified natural resins, natural rubbers, synthetic rubbers, and mixtures thereof.

6. The method of claim 1 wherein said adhesive composition has a further content of from 0.1 to 3 percent by weight based on the total composition, of a water-soluble macromolecular substance.

7. The method of claim 1 wherein said adhesive composition has a further content of from 0.1 to 20 percent by weight based on the total composition, of an inorganic thickener.

* * * * *

UNITED STATES PATENT OFFICE
CERTIFICATE OF CORRECTION

Patent No. 3,755,044        Dated August 28, 1973

Inventor(s) Hans-Georg Schel

It is certified that error appears in the above-identified patent and that said Letters Patent are hereby corrected as shown below:

On the cover sheet insert -- [73] Assignee: Henkel & Cie GmbH, Dusseldorf-Holthausen, Germany --. Column 2, line 15, "adhesive" should read -- adhesives --. Column 3, Table I, Example 1, Polyethylene dispersion, Percent Weight Column, "70,70" should read -- 70, 30 --. Column 5, line 26, "draft" should read -- kraft --.

Signed and sealed this 8th day of October 1974.

(SEAL)
Attest:

McCOY M. GIBSON JR.
Attesting Officer

C. MARSHALL DANN
Commissioner of Patents